(12) United States Patent
Okochi

(10) Patent No.: US 12,716,494 B2
(45) Date of Patent: Aug. 25, 2026

(54) SEALING DEVICE AND BACK-UP RING

(71) Applicant: NOK CORPORATION, Tokyo (JP)

(72) Inventor: Kakeru Okochi, Kitaibaraki (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/834,893

(22) PCT Filed: Feb. 1, 2023

(86) PCT No.: PCT/JP2023/003235
§ 371 (c)(1),
(2) Date: Jul. 31, 2024

(87) PCT Pub. No.: WO2023/157639
PCT Pub. Date: Aug. 24, 2023

(65) Prior Publication Data
US 2025/0020210 A1 Jan. 16, 2025

(30) Foreign Application Priority Data
Feb. 15, 2022 (JP) ................................ 2022-020961

(51) Int. Cl.
*F16J 15/18* (2006.01)
*F16J 15/20* (2006.01)
*F16J 15/3204* (2016.01)

(52) U.S. Cl.
CPC ............... *F16J 15/18* (2013.01); *F16J 15/20* (2013.01); *F16J 15/3204* (2013.01)

(58) Field of Classification Search
CPC ........... F16J 15/20; F16J 15/18; F16J 15/3204
See application file for complete search history.

(56) References Cited

U.S. PATENT DOCUMENTS 3,873,106 A * 3/1975 Pastelak ................... F16J 15/20 264/137
6,007,070 A * 12/1999 Heathcott ................ F16J 15/18 277/540

(Continued)

FOREIGN PATENT DOCUMENTS

DE 10-2011-080748 A1 2/2013
JP S62-062857 A 3/1987

(Continued)

OTHER PUBLICATIONS

International Search Report of the International Searching Authority, issued in PCT/JP2023/003235, mailed Mar. 20, 2023; ISA/JP (5 pages).

(Continued)

*Primary Examiner* — Eugene G Byrd
(74) *Attorney, Agent, or Firm* — Harness, Dickey & Pierce, P.L.C.

(57) ABSTRACT

A sealing device is configured to seal a clearance between a housing and a shaft of a hydraulic cylinder. The sealing device includes an annular packing that is disposed within the clearance and comprises an elastic material, and a back-up ring that is in contact with the packing. The back-up ring has a contact surface that is in contact with the shaft, and a portion including at least the contact surface of the back-up ring comprises a resin composition that includes a base material and a filler material. The base material comprises a polyamide resin, and the filler material comprises a polyolefin resin that is compatible with the polyamide resin.

9 Claims, 6 Drawing Sheets

(56) References Cited

U.S. PATENT DOCUMENTS

| | | | | |
|---|---|---|---|---|
| 6,349,943 | B1 | 2/2002 | Ishii et al. | |
| 8,474,829 | B2 * | 7/2013 | Otsuka | F16J 15/166 277/584 |
| 8,840,115 | B2 * | 9/2014 | Johnson | F16J 15/56 277/552 |
| 9,512,924 | B2 * | 12/2016 | Uesugi | F16J 15/166 |
| 2006/0272498 | A1 | 12/2006 | Fischer | |
| 2013/0313780 | A1 * | 11/2013 | Johnson | E21B 33/1208 277/300 |
| 2023/0313889 | A1 * | 10/2023 | Zong | F16J 15/166 |

FOREIGN PATENT DOCUMENTS

| | | | | |
|---|---|---|---|---|
| JP | 2004036631 | A * | 2/2004 | |
| JP | 2012-026490 | A | 2/2012 | |
| JP | 5100062 | B2 | 12/2012 | |
| JP | 2015-218205 | A | 12/2015 | |
| JP | 5825431 | B2 * | 12/2015 | F15B 15/1423 |
| JP | 2020-008088 | A | 1/2020 | |
| WO | WO-2015064059 | A1 * | 5/2015 | C09K 3/1006 |
| WO | WO-2020197560 | A1 * | 10/2020 | B33Y 80/00 |
| WO | 2021-074959 | A1 | 4/2021 | |

OTHER PUBLICATIONS

Extended European Search Report for corresponding European Patent Application No. 23756166.7 dated Jan. 22, 2026 (11 Pages).

* cited by examiner

SEALING DEVICE AND BACK-UP RING

CROSS REFERENCE TO RELATED APPLICATIONS

This application is a 371 U.S. National Phase of International Application No. PCT/JP2023/003235, filed on Feb. 1, 2023, which claims priority to Japanese Patent Application No. 2022-020961, filed Feb. 15, 2022. The entire disclosures of the above applications are incorporated herein by reference.

BACKGROUND

Technical Field

The present invention relates to sealing devices and back-up rings.

Related Art

Known in the art is a sealing device for sealing an annular clearance between a housing and a shaft of a hydraulic cylinder used in construction machinery.

For example, Japanese Patent Application, Laid-Open Publication No. 2020-8088 (Patent Document 1) discloses a structure that includes a buffer ring, a rod packing, and a dust seal disposed in that order in a direction along an axis of a shaft from an inside to an outside of a housing. The buffer ring is a member for countering a hydraulic pressure that acts on the rod packing. The buffer ring includes a packing formed from an elastic material such as a urethane resin, and a back-up ring formed from a rigid resin such as a polyamide resin. The buffer ring packing and the back-up ring are configured to interfit. The back-up ring serves to inhibit deformation of the rod packing when the rod packing is subject to excessive pressure from within the housing.

In the configuration disclosed in Patent Document 1, during low-speed operation of the hydraulic cylinder, an abnormal noise may occur, caused by a lack of slidability of the back-up ring against the shaft.

SUMMARY

To solve the above-described problem, a sealing device according to one aspect of the present disclosure includes a rod packing configured to seal an annular clearance between a housing and a shaft of a hydraulic cylinder used in construction machinery; and a buffer ring for countering a hydraulic pressure that acts on the rod packing, the buffer ring including an annular packing formed from an elastic material and disposed within the clearance, and a back-up ring in contact with the packing. The back-up ring has a contact surface that is in contact with the shaft, at least a portion that includes the contact surface of the back-up ring comprises a resin composition that includes a base material and a filler material, the base material comprising a polyamide resin, and the filler material comprising a low friction resin compatible with the polyamide resin and having a lower static friction coefficient than the polyamide resin with respect to the shaft.

According to one aspect of the present disclosure a back-up ring is provided for countering a hydraulic pressure that acts on a rod packing configured to seal an annular clearance between a housing and a shaft of a hydraulic cylinder used in construction machinery. The back-up ring comprises a resin composition that includes a base material and a filler material. The base material comprises a polyamide resin, and the filler material comprises a low friction resin that is compatible with the polyamide resin and has a lower static friction coefficient than the polyamide resin with respect to the shaft.

DETAILED DESCRIPTION

Figure 1:
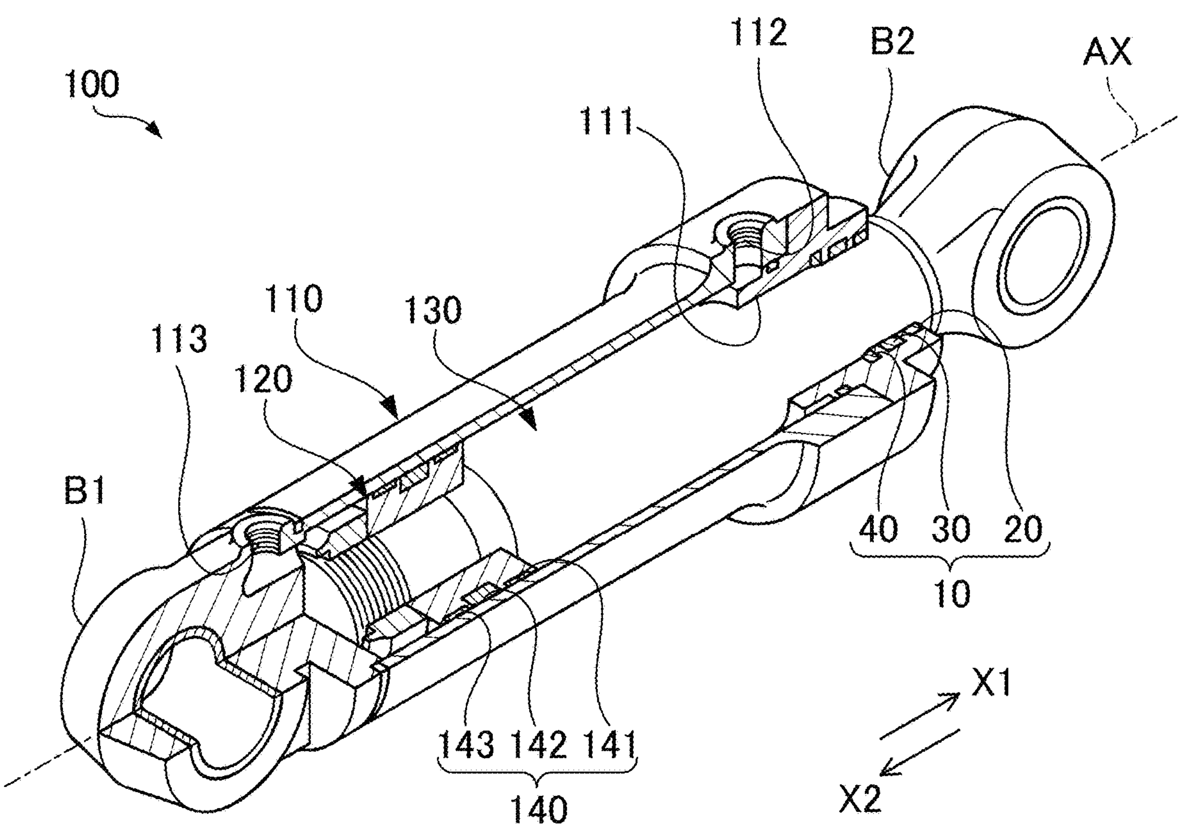
FIG. 1 is a perspective view showing the hydraulic cylinder including a sealing device according to the embodiment.

A preferred embodiment according to the present disclosure will now be described with reference to the attached drawings. In the drawings, some portions are schematically illustrated for ease of understanding. A dimension and scale of elements illustrated in the drawings may differ from those of actual elements. The scope of the present disclosure is not limited to the embodiments, unless otherwise stated.

1. First Embodiment

1-1. Overview of a Hydraulic Cylinder 100 Including a Sealing Device 10

FIG. 1 is a perspective view of the hydraulic cylinder 100 including the sealing device 10 according to the present embodiment. The hydraulic cylinder 100 is a telescopic mechanism that extends and retracts along a direction of an axis AX under application of hydraulic pressure. The hydraulic cylinder 100 is used for example as a power source in construction, general industry, or other machinery.

As shown in FIG. 1, the hydraulic cylinder 100 includes a housing 110, a piston 120, a shaft 130, a sealing system 140, and a sealing device 10. Each part of the hydraulic cylinder 100 will now be briefly described with reference to FIG. 1.

In the following description, one direction extending along the axis AX is referred to as an "X1 direction," while a direction extending in an opposite direction to the X1 direction is referred to as an "X2 direction." The X1 direction and the X2 direction may be collectively referred to as an "axial direction." A direction extending circumferentially around the axis AX may be referred to as a "circumferential direction"; and a direction perpendicular to and intersecting the axis AX may be referred to as a "radial direction."

The housing 110 is a bottomed cylindrical tube extending in the direction along the axis AX. The housing 110 may comprise a metal material such as an iron stainless steel or an aluminum alloy.

In the example shown in FIG. 1, the housing 110 has an opening at an end in the X1 direction, and a boss B1 at an end in the X2 direction. The housing 110 is provided with a port 112 and a port 113. The port 112 is an opening for intake or exhaust of a hydraulic fluid into or out of a space within the housing 110, with the space being positioned in the X1 direction relative to the piston 120. The port 113 is an opening for intake or exhaust of the hydraulic fluid into or out of a space within the housing 110, with the space being positioned in the X2 direction relative to the piston 120. A pressure of the hydraulic fluid within the housing 110 can be adjusted via the ports 112 and 113.

The shape of the housing 110 is not limited to the example illustrated in FIG. 1 and any shape can be adopted as long as a clearance to be sealed by the sealing device 10 can be formed between the housing 110 and the shaft 130.

The piston 120 is a structure that is disposed to be reciprocable within the housing 110 in each direction along the axis AX. The piston 120 bisects the housing 110 into a space in the X1 direction relative to the piston 120 and a space in the X2 direction relative to the piston 120. The piston 120 may comprise a metal material such as an iron or stainless steel, or an aluminum alloy. The piston 120 reciprocates with respect to the housing 110 in the directions along the axis AX in response to an adjustment in the pressure of the hydraulic fluid inside the housing 110 via the ports 112 and 113.

The shape of the piston 120 is not limited to the example illustrated in FIG. 1, and any appropriate shape can be used.

The shaft 130 is a piston rod that extends in the direction along the axis AX. The piston 120 is secured to an end of the shaft 130 in the X2 direction or to a portion nearby. In response to movement of the piston 120 relative to the housing 110 in the directions along the axis AX, the shaft 130 also moves relative to the housing 110 in the directions along the axis AX. The shaft 130 may comprise a metal material such as an iron or stainless steel, or an aluminum alloy.

In the example shown in FIG. 1, a boss B2 is arranged at an end in the X1 direction of the shaft 130. The distance between the bosses B1 and B2 varies as the piston 120 moves relative to the housing 110 in the directions along the axis AX.

The shape of the shaft 130 is not limited to the example illustrated in FIG. 1 and any shape can be adopted as long as a clearance to be sealed by the sealing device 10 can be formed between the housing 110 and the shaft 130.

The sealing system 140 is a piston sealing system comprised of a set of component parts for sealing an annular clearance defined between the piston 120 and the housing 110. In the example shown in FIG. 1, the sealing system 140 includes a wear ring 141, a piston packing 142, and a contamination seal 143, disposed in that order in the X2 direction. The outer circumferential surface of the piston 120 is provided with annular grooves (not shown) to respectively accommodate the wear ring 141, the piston packing 142, and the contamination seal 143.

The wear ring 141 is an annular member that functions as a sliding bearing to reduce eccentricity of the shaft 130 with respect to the housing 110, thereby improving sealability and durability of the piston packing 142. The wear ring 141 may comprise a resinous material such as PTFE (polytetrafluoroethylene), a polyester resin, a phenol resin, or a polyamide resin.

The piston packing 142 is an annular structure for sealing an annular clearance between the housing 110 and the piston 120, and includes a seal ring and a back-up ring (not shown). The seal ring comprises a rigid material such as a polyamide resin. The piston packing 142 is in contact with an inner circumferential surface of the bore 111 of the housing 110. The back-up ring is disposed between the seal ring and the piston 120, and comprises an elastic material such as a urethane resin. While in an elastically deformed state, the back-up ring urges the seal ring toward the inner circumferential surface of the bore 111 of the housing 110.

The contamination seal 143 is an annular member for preventing intrusion of contaminants from the space in the housing 110 in the X2 direction of the piston 120 into the piston packing 142. The contamination seal 143 may comprise a resinous material such as PTFE. The contamination seal 143 is in contact with both the housing 110 and the piston 120 while in the elastically deformed state.

The configuration of the above-mentioned sealing system 140 is not limited to the example illustrated in FIG. 1. In so far as the sealing system 140 seals the annular clearance between the housing 110 and the piston 120, any appropriate configuration can be used.

The sealing device 10 is a rod sealing system comprised of a set of component parts for sealing an annular clearance between the housing 110 and the shaft 130.

1-2. Details of the Sealing Device 10

Figure 2:
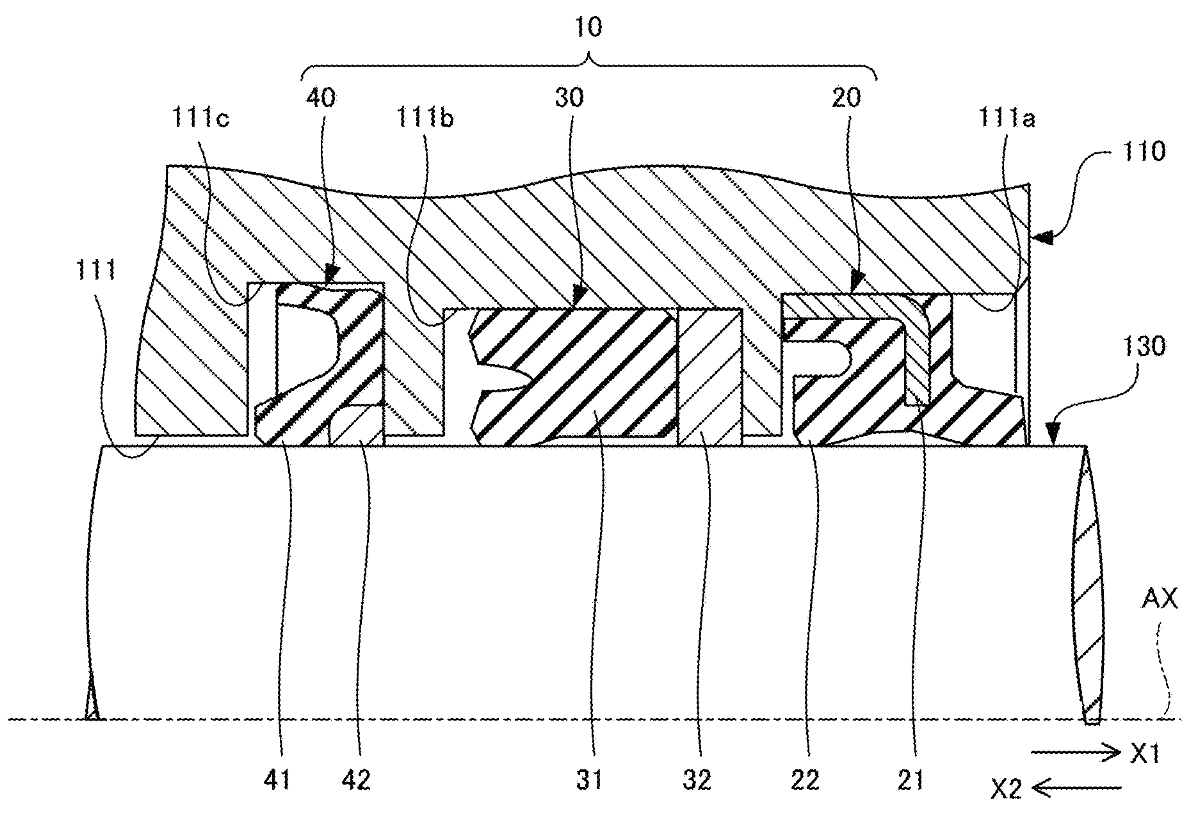
FIG. 2 is a partial enlarged cross-sectional view of a hydraulic cylinder as shown in FIG. 1.

FIG. 2 is a partial enlarged cross-sectional view of the hydraulic cylinder 100 shown in FIG. 1. FIG. 2 shows a cross section of a portion of the hydraulic cylinder 100 cut along a plane including the axis AX. As shown in FIG. 2, the sealing device 10 includes a dust seal 20, a rod packing 30, and a buffer ring 40, disposed in that order in the X2 direction. The inner circumferential surface of the bore 111 of the housing 110 is provided with annular grooves 111*a*, 111*b*, and 111*c*. The dust seal 20 is disposed in the groove 111*a*; the rod packing 30 is disposed in the groove 111*b*; and the buffer ring 40 is disposed in the groove 111*c*.

The dust seal 20 is an annular member for preventing foreign matter such as dirt from water or airborne dust from intruding from an outer space of the housing 110 into the rod packing 30. The dust seal 20 includes a reinforcing ring 21 and a seal member 22.

The reinforcing ring 21 is an annular member for strengthening the seal member 22 circumferentially around the axis AX. In the example shown in FIG. 2, the reinforcing ring 21 is generally L-shaped as viewed in cross section cut along the plane including the axis AX. The reinforcing ring 21 may comprise a metal material such as stainless steel. The seal member 22 is an annular elastic member secured to the reinforcing ring 21, and is in contact with both a wall surface of the groove 111*a* and the outer circumferential surface of the shaft 130. In the example shown in FIG. 2, the seal member 22 includes two obliquely extending portions as viewed in the cross section cut along the plane including the axis AX. One portion extends in the X1 direction and the other portion extends in the X2 direction, each from a portion proximate the inner circumferential edge of the reinforcing ring 21 toward the shaft 130. The seal member 22 comprises an elastic material such as a urethane resin. The seal member 22 is in contact with both the housing 110 and the shaft 130 while in an elastically deformed state. The configuration of the dust seal 20 is not limited to that illustrated in FIG. 1 and any appropriate configuration can be used. The dust seal 20 is provided as needed and may be omitted as appropriate.

The rod packing 30 is an annular member that functions as a main seal for preventing leakage of hydraulic fluid from inside the housing 110 to the outer space. The rod packing 30 includes a packing 31 and a back-up ring 32.

The packing 31 is an annular elastic member that is in contact with both a wall surface of the groove 111*b* and the outer circumferential surface of the shaft 130. In the example shown in FIG. 2, the packing 31 is generally U-shaped as viewed in the cross-section cut along the plane including the axis AX. The packing 31 comprises an elastic material such as a urethane resin. The packing 31 is in contact with both the housing 110 and the shaft 130 while in an elastically deformed state.

The back-up ring 32 is a flat washer-shaped member that is in close contact with a surface of the packing 31 facing in the X1 direction. The back-up ring 32 comprises, for example, a resinous material such as PTFE (polytetrafluoroethylene), a polyester resin, a phenol resin, or a polyamide resin. The back-up ring 32 functions as a sliding bearing for reducing eccentricity of the shaft 130 with respect to the housing 110, thereby improving sealability and durability of the rod packing 30. The configuration of the rod packing 30 is not limited to that illustrated in FIG. 1 and any appropriate configuration can be used.

The buffer ring 40 is an annular member for countering hydraulic pressure that acts on the rod packing 30, thereby enhancing durability of the rod packing 30. The buffer ring 40 includes a packing 41 and a back-up ring 42.

The packing 41 is an annular elastic member disposed within the clearance between the housing 110 and the shaft 130. The packing 41 is in contact with both a wall surface of the groove 111*c* and the outer circumferential surface of the shaft 130. In the example shown in FIG. 2, the packing 41 is generally U-shaped as viewed in the cross-section cut along the plane including the axis AX. The packing 41 comprises an elastic material such as a urethane resin. The packing 41 is in contact with both the housing 110 and the shaft 130 while in an elastically deformed state. Inclusion of the urethane resin in the elastic material comprising the packing 41 prevents hydraulic fluid from reaching the rod packing 30.

The back-up ring 42 is an annular member disposed within the clearance between the housing 110 and the shaft 130 and in contact with the packing 41. The back-up ring 42 is in close contact with an inner circumferential surface of the packing 41. The back-up ring 42 reduces deformation of the packing 41 caused by excessive hydraulic pressure from within the housing 110. Thus, hydraulic pressure from a position in the X2 direction relative to the buffer ring 40 is received at the buffer ring 40 in a suitable manner, thereby suitably countering hydraulic pressure acting on the rod packing 30.

Figure 3:
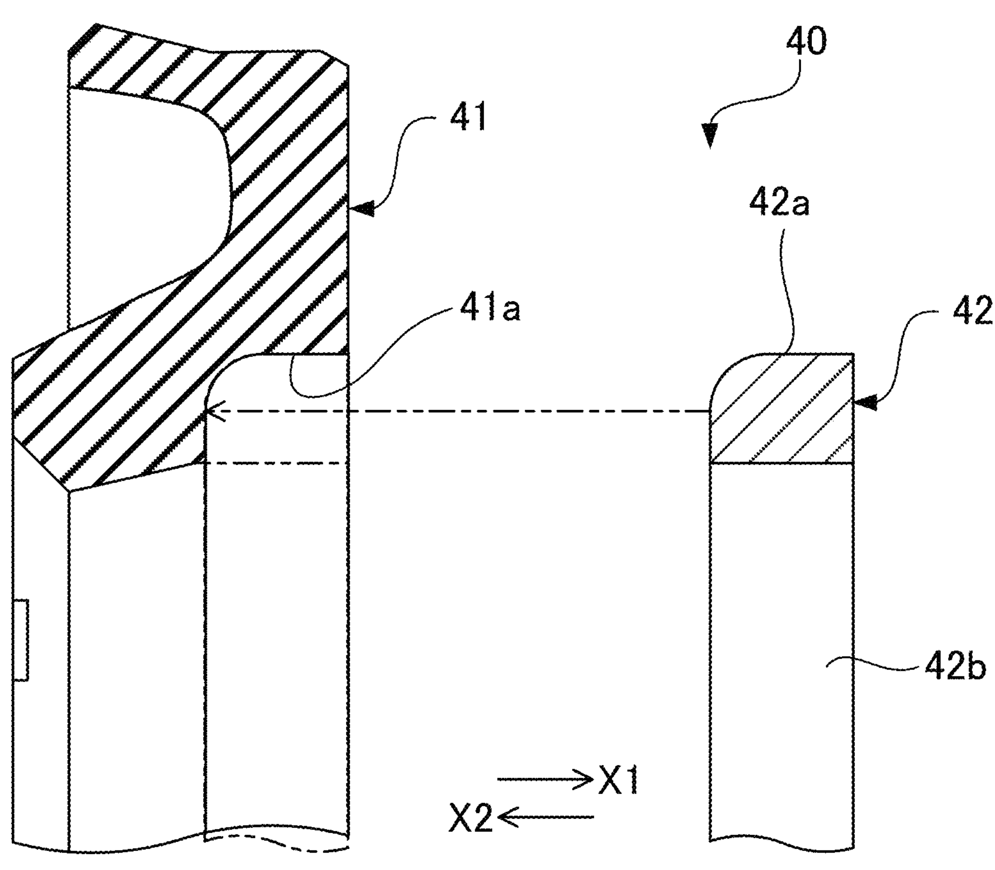
FIG. 3 is an explanatory diagram of a buffer ring of the sealing device according to the embodiment.

FIG. 3 is an explanatory diagram of the buffer ring 40 of the sealing device 10 according to the embodiment. As shown in FIG. 3, the inner circumferential surface of the packing 41 is provided with a groove 41*a*. The back-up ring 42 is fitted into the groove 41*a*. The back-up ring 42 includes a surface 42*a* that is in close contact with the groove 41*a*, and an inner circumferential surface 42*b*. The inner circumferential surface 42*b* is a contact surface that is in contact with the outer circumferential surface of the shaft 130.

The back-up ring 42 includes the inner circumferential surface 42*b*, at least a portion of which comprises a resin composition formed from a base material and a filler material that are combined to be homogeneous with each other. The base material comprises a polyamide resin. The filler material comprises a low friction resin that is compatible with the polyamide resin and has a lower static friction coefficient with respect to the shaft 130 than the polyamide resin. The resin composition is a polymer alloy formed by combining the polyamide resin with the low friction resin to be homogeneous with each other. Thus, the combination of the polyamide resin and the low friction resin can suitably yield the advantages of both materials.

The polyamide resin referred to herein has excellent heat resistance, mechanical properties, chemical resistance, and an extremely low kinetic friction resistance. However, the polyamide resin has relatively high static friction resistance. Therefore, if the back-up ring 42 is formed only from a polyamide resin, the back-up ring 42 may lack slidability against the shaft 130 resulting in abnormal noise, during low-speed operation of the hydraulic cylinder 100.

Accordingly, by using as a filler material a low-friction resin that has a lower static friction coefficient with respect to the shaft 130 than a polyamide resin, a static friction coefficient of the back-up ring 42 with respect to the shaft 130 can be reduced.

Figure 4:
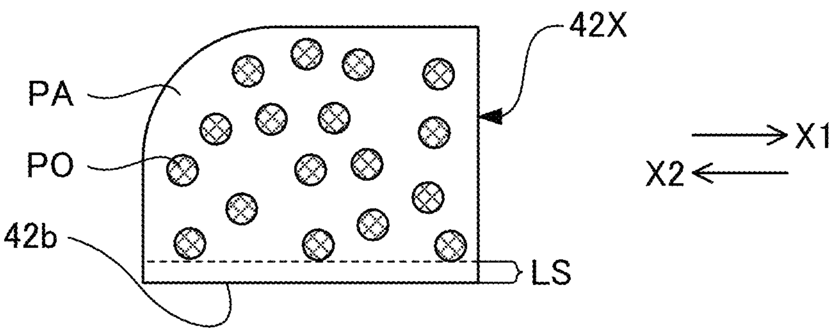
FIG. 4 is a schematic diagram showing the state of a filler material within the back-up ring using the filler material that is not compatible with the polyamide resin.

FIG. 4 is a schematic drawing showing a state of a filler material PO within a back-up ring 42X and that is not compatible with a corresponding polyamide resin PA. As shown in FIG. 4, in the back-up ring 42X, the filler material PO is in a simply mixed state with a polyamide resin PA, and as a result, portions consisting of the filler material PO only and of the polyamide resin PA only are present in the back-up ring 42X. Consequently, the filler material PO is not readily exposed on the surface of the back-up ring 42X, and tends to be covered with the polyamide resin PA.

Consequently, a skin layer LS is formed of the polyamide resin PA only with a thickness of around 10 μm-20 μm on the surface of the back-up ring 42X. Even if the filler material PO has self-lubricating properties, such properties cannot be sufficiently utilized in the back-up ring 42X.

Figure 5:
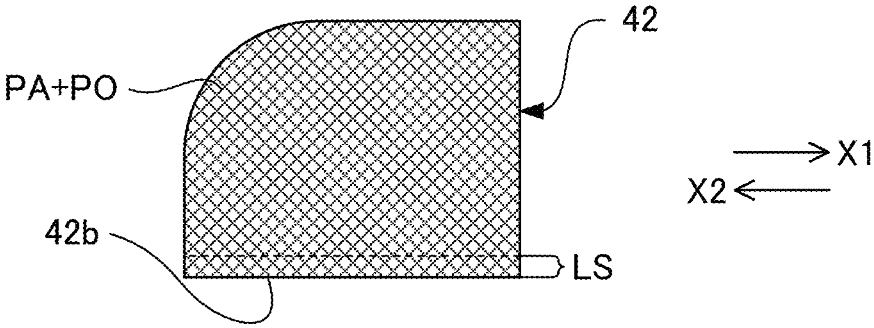
FIG. 5 is a schematic diagram showing the state of the filler material within the back-up ring using the filler material that is compatible with the polyamide resin.

FIG. 5 is a schematic diagram showing a state of the filler material PO within the back-up ring 42 and that is compatible with the polyamide resin PA. As shown in FIG. 5, in the back-up ring 42, the filler material PO in a dissolved state is combined with the polyamide resin PA. The filler material PO is uniformly present over the entire body of the back-up ring 42 and also is uniformly present on the surface of the back-up ring 42. Consequently, the self-lubricating properties of the filler material PO can be sufficiently utilized in the surface of the back-up ring 42 even in a portion corresponding to the skin layer LS.

Although any resinous material that has an acid amide bond (—COHN—) in its molecule may be used as the polyamide resin for the resin composition comprising the back-up ring 42, an aliphatic polyamide is best suited for use.

Examples of the aliphatic polyamide include polycaproamide (polyamide 6), polypentamethyleneadipamide (polyamide 56), polyhexamethyleneadipamide (polyamide 66), polyundecaneamide (polyamide 11), polyrauryllactum (polyamide 12), polytetramethyleneadipamide (polyamide 46), polytetramethylenesebacamide (polyamide 410), polypentamethylenesebacamide (polyamide 510), polyhexamethylenesebacamide (polyamide 610), polyhexamethylenedodecamide (polyamide 612), polydecamethyleneadipamide (polyamide 106), polydecamethylenesebacamide (polyamide 1010), and the like.

Particularly, in view of mechanical strength, a polyamide resin comprising the resin composition of the back-up ring 42 preferably includes at least one of polyamide 46 (PA46), polyamide 66 (PA66), or polyamide 11 (PA11), with polyamide 46 being particularly preferable.

On the other hand, it suffices in so far as a low friction resin comprising the resin composition of the back-up ring 42 is a resin that is compatible with a polyamide resin and has a lower static friction coefficient with respect to the shaft 130 than the polyamide resin. Although not particularly limited thereto, a polyolefin resin is preferred. The static friction coefficient of a polyolefin resin is lower than the static friction resistance of a polyamide resin. Furthermore, the kinetic friction coefficient of a polyolefin resin is relatively low, although higher than the kinetic friction resistance of a polyamide resin. Thus, by forming the back-up ring 42 by combining a polyolefin resin with a compatible polyamide resin to be homogeneous with each other, it is possible to obtain the back-up ring 42 with low coefficients of both kinetic and static friction, while benefiting from excellent heat resistance, mechanical properties, and chemical resistance inherent to polyamide resins.

To provide compatibility with a polyamide resin comprising the resin composition of the back-up ring 42, the polyolefin resin comprising the resin composition of the back-up ring 42 is a polyolefin resin modified by introducing a reactive functional group such as carboxylic acid, acid anhydride, and epoxy function, into a polyolefin such as polyethylene resin, polypropylene resin, and ethylene propylene copolymer. Particularly, in view of excellent compatibility with a polyamide resin, a maleic acid modified polyolefin resin is preferable as the polyolefin resin comprising the resin composition of the back-up ring 42, with a maleic acid modified polyethylene resin being preferable.

The polyolefin resin is preferably a polyethylene resin because the polyolefin resin has a low static friction coefficient compared with a polypropylene resin and the like.

A density of the polyolefin resin is preferably equal to or greater than 0.85 and equal to or smaller than 0.90. In other words, the polyolefin resin is preferably a low-density polyolefin resin. The low-density polyolefin resin has an advantage in that it has excellent compatibility with the polyamide resin, in contrast to a high-density polyolefin resin.

A content of a filler material in the resin composition comprising the back-up ring 42 is preferably equal to or higher than 1 vol % and equal to or lower than 50 vol %, more preferably equal to or higher than 5 vol % and equal to or lower than 40 vol %, still more preferably equal to or higher than 5 vol % and equal to or lower than 20 vol %. With the content within one of the above-mentioned ranges, advantages of the polyamide resin and the low-friction resin can each be suitably utilized. For example, an advantage is obtained such that along with an increase in mechanical strength of the back-up ring 42, a reduction in a static friction coefficient thereof is also attained. On the other hand, use of an excessively low content may make it difficult to obtain best use of an advantage of the low-friction resin. Conversely, an excessively high content may undermine the advantage of the polyamide resin.

EXAMPLES

Specific examples of the present invention will now be described. The present invention is not limited to those mentioned below.

A. Manufacture of Back-Up Rings

A-1. Example 1

A back-up ring according to Example 1 was manufactured by employing polyamide 46 as a base material and a maleic acid modified low-density polyethylene as a filler material.

Specifically, polyamide 46 and a maleic acid modified low-density polyethylene were first weighed to obtain a content of maleic acid modified low-density polyethylene in the resin composition of 20 vol %.

The polyamide 46 and the maleic acid modified low-density polyethylene were then mixed using a tumbler, and the mixture was kneaded in a twin screw extruder at a temperature of 260° C.-310° C. to form pellets of the resin composition. The pellets were then passed through an injection-molding machine to obtain the back-up ring. The temperature of the cylinder of the injection-molding machine was 285° C.-295° C., and that of the mold was 120° C.

A-2. Example 2

A back-up ring according to Example 2 was manufactured in the same manner as in the above-mentioned Example 1 except that polyamide 11 was used as the base material instead of polyamide 46.

A-3. Example 3

A back-up ring according to Example 3 was manufactured in the same manner as in the above-mentioned Example 1 except that polyamide 66 was used as the base material instead of polyamide 46.

A-4. Example 4

A back-up ring according to Example 4 was manufactured in the same manner as in the above-mentioned Example 1 except that the content of the maleic acid modified low-density polyethylene in the resin composition was 5 vol %.

A-5. Comparative Example 1

A back-up ring according to Comparative Example 1 was manufactured in the same manner as in the above-mentioned Example 1 except that the maleic acid modified low-density polyethylene, which is a low friction resin, was not used and only polyamide 46 was used.

A-6. Comparative Example 2

A back-up ring according to Comparative Example 2 was manufactured in the same manner as in the above-mentioned Example 2 except that the maleic acid modified low-density polyethylene, which is a low friction resin, was not used and only polyamide 11 was used.

A-7. Comparative Example 3

A back-up ring according to Comparative Example 3 was manufactured in the same manner as in the above-mentioned Example 3 except that the maleic acid modified low-density polyethylene, which is low friction resin, was not used and only polyamide 66 was used.

A-8. Reference Example 1

A back-up ring of Reference Example 1 was manufactured in the same manner as in the above-mentioned Example 1 except that, as the filler material, a PTFE of average particle diameter of 50 μm was used instead of the maleic acid modified low-density polyethylene. The content of the PTFE in the resin composition was set as 7 vol %.

A-9. Reference Example 2

A back-up ring according to Reference Example 2 was manufactured in the same manner as in the above-mentioned Example 1 except that polyamide 66 was used as the base material instead of polyamide 46, oil was used instead of the maleic acid modified low-density polyethylene, and the content of oil in the resin composition forming the back-up ring was set at 10 vol %.

A-10. Reference Example 3

A back-up ring according to Reference Example 3 was manufactured in the same manner as in Example 1 except that polyamide 11 was used as the base material instead of polyamide 46, and a molybdenum disulfide of average particle diameter of 5 μm was used instead of the maleic acid modified low-density polyethylene. The content of the molybdenum disulfide in the resin composition was set at 0.5 vol %.

B. Evaluation of the Back-Up Rings

B-1. Measuring Apparatus

Figure 6:
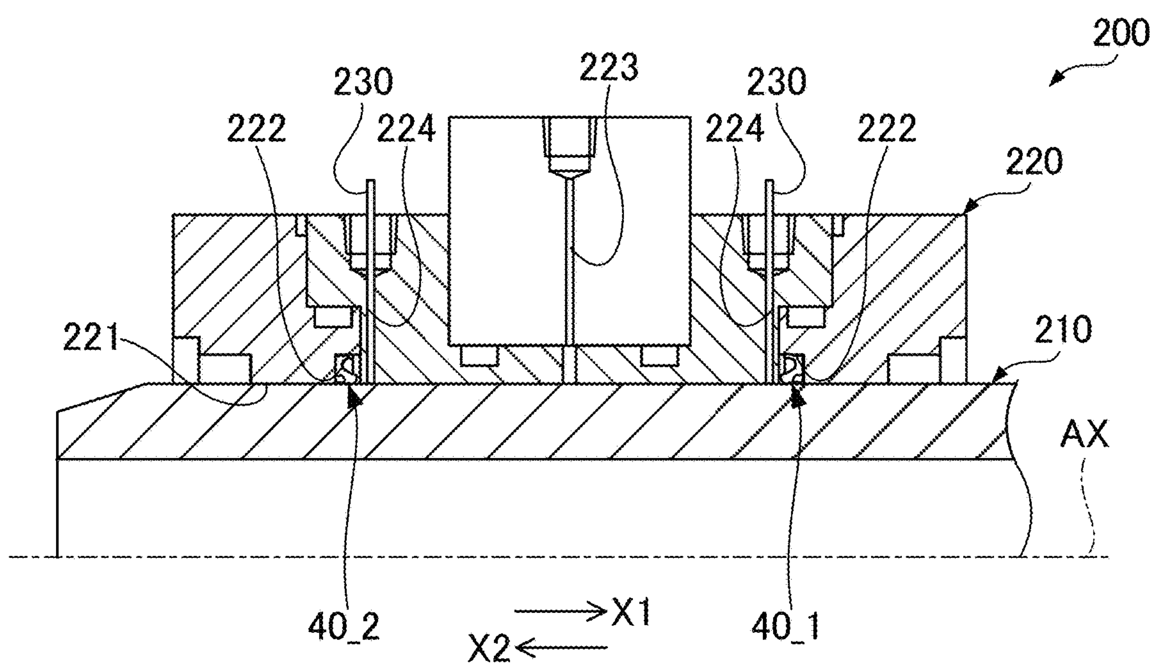
FIG. 6 is a diagram illustrating an apparatus for measuring sliding resistances of the back-up ring.

FIG. 6 is a diagram illustrating an apparatus 200 for measuring a sliding resistance of the back-up rings. The apparatus 200 includes a shaft 210, a housing 220, and a pair of thermocouples 230. The shaft 210 is a cylinder made of an iron and reciprocable in the directions along the axis AX. The housing 220 is a cylindrical tube made of an iron and includes a bore 221, a corresponding pair of grooves 222, a bore 223, and a corresponding pair of bores 224.

The shaft 210 is inserted into the bore 221. The buffer rings 40_1 and 40_2, including back-up rings to be measured are fitted in the two grooves 222, respectively. The buffer rings 40_1 and 40_2 have the same composition. The buffer rings 40_1 and 40_2 are arranged to be symmetrical with each other such that each back-up ring is in contact with a side surface away from the bore 223 of the two surfaces of a corresponding groove 222. The bore 223 extends through the housing 220 to open from the inner circumferential surface of the bore 221. Although not shown in the drawings, a device is connected to the bore 223 for introducing a hydraulic fluid at a predetermined pressure toward the bore 221. Each of the pair of bores 224 extends through the housing 220 to open from the inner circumferential surface of the bore 221. On the inner circumferential surface of the bore 221, each bore 224 is open adjacent to a corresponding groove 222. The thermocouples 230 are inserted into respective bores 224.

B-2. Evaluations

The sliding resistance of the back-up rings of the Examples, the Comparative Examples, and the Reference Examples was measured using the above-mentioned apparatus 200 under the following conditions, and evaluations were then made by ascertaining whether abnormal noise was produced. For each Example and each Comparative Example, a variation width of the sliding resistance i.e., a sliding resistance width, was measured.

Measuring Conditions

- Pressure of Hydraulic fluid: 35 MPa
- Displacement speed of the shaft 210: 25 mm/s
- Stroke of the shaft 210: 200 mm
- Temperature: 80° C.
- Hydraulic fluid: Daphne Super Hydro 46A (made by Idemitsu Kosan Co., Ltd.)

The results of the evaluations are listed in Table 1 together with types and respective content amounts of the base material and the filler material used for forming the back-up rings, along with compatibilities of respective base materials and the filler materials.

TABLE 1

| | Back-up Ring | | | | | Evaluation | |
|---|---|---|---|---|---|---|---|
| | Base Material | | Filler Material | | | | Sliding Resistance |
| | Material | Content | Material | Content | Compatibility | Abnormal Noise | Width [N] |
| Example 1 | PA46 | 80 vol % | PE | 20 vol % | Compatible | Not Produced | 0 |
| Example 2 | PA11 | 80 vol % | PE | 20 vol % | Compatible | Not Produced | 0 |
| Example 3 | PA66 | 80 vol % | PE | 20 vol % | Compatible | Not Produced | 0 |
| Example 4 | PA46 | 95 vol % | PE | 5 vol % | Compatible | Not Produced | 0 |
| Comparative Example 1 | PA46 | 100 vol % | — | — | — | Produced | 1080 |
| Comparative Example 2 | PA11 | 100 vol % | — | — | — | Produced | 532 |
| Comparative Example 3 | PA66 | 100 vol % | — | — | — | Produced | 772 |
| Reference Example 1 | PA46 | 93 vol % | PTFE | 7 vol % | Not Compatible | Produced | Not Measured |
| Reference Example 2 | PA66 | 90 vol % | | 10 vol % | Not Compatible | Produced | Not Measured |
| Reference Example 3 | PA11 | 99.5 vol % | MoS | 0.5 vol % | Not Compatible | Produced | Not Measured |

In Table 1; "PA46" denotes polyamide 46; "PA11" denotes polyamide 11; and "PA66" denotes polyamide 66. "PE" denotes maleic acid modified low-density polyethylene, and "MoS" denotes molybdenum disulfide.

As shown in Table 1, no abnormal noise was produced in any of the Examples. In contrast, abnormal noise was produced in each of the Comparative Examples and Reference Examples.

Figure 7:
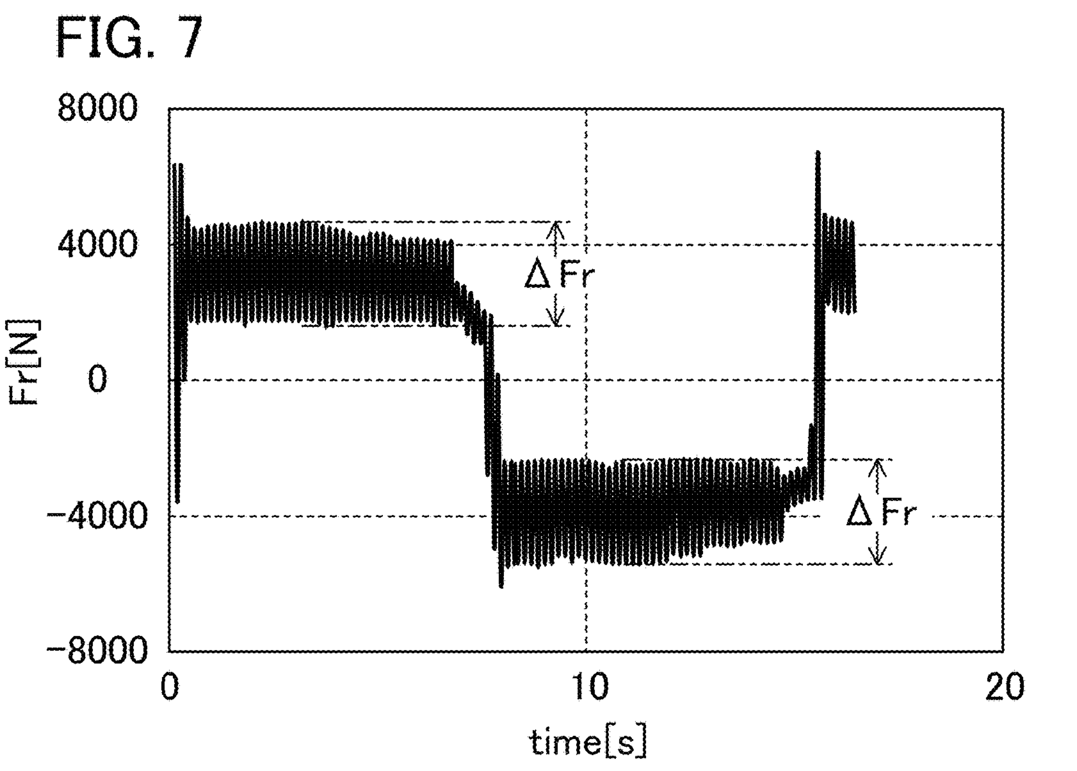
FIG. 7 is a diagram showing a waveform representative of a sliding resistance under low-speed operation of the back-up ring according to Comparative Example 1.

FIG. 7 is a diagram showing a waveform of the sliding resistance of the back-up ring according to Comparative Example 1 measured during low-speed operation. In FIG. 7 a temporal variation in sliding resistance is apparent when the shaft 210 moved at a speed of 25 mm/s. As shown in FIG. 7, in Comparative Example 1, a variation width of the sliding resistance i.e., a sliding resistance variation ΔFr, was relatively large. Furthermore, in Comparative Example 1, abnormal noise was produced during measurement.

Figure 8:
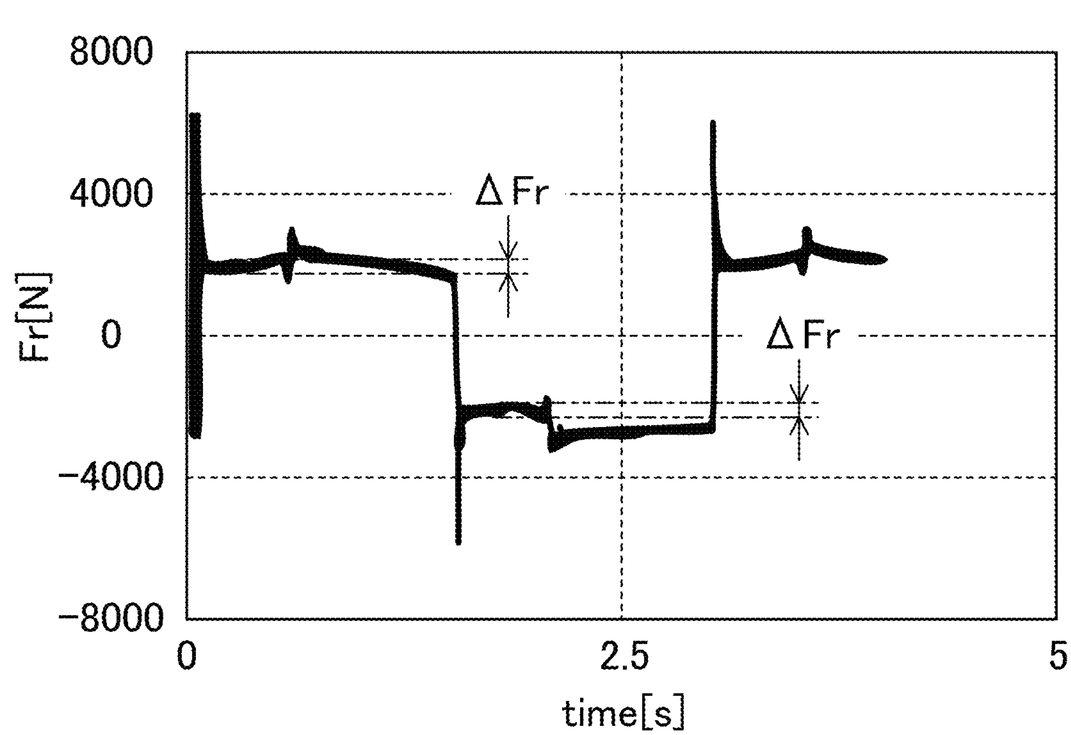
FIG. 8 is a diagram showing a waveform representative of a sliding resistance under high-speed operation of the back-up ring according to Comparative Example 1.

FIG. 8 is a diagram showing a waveform of the sliding resistance of the back-up ring according to Comparative Example 1 measured during high-speed operation. In FIG. 8 a temporal variation in the sliding resistance is apparent when the shaft 210 moved at a speed of 400 mm/s. As shown in FIG. 8, in Comparative Example 1, when the moving speed of the shaft 210 increased, the sliding resistance variation ΔFr was relatively small, and no abnormal noise was produced during measurement.

Figure 9:
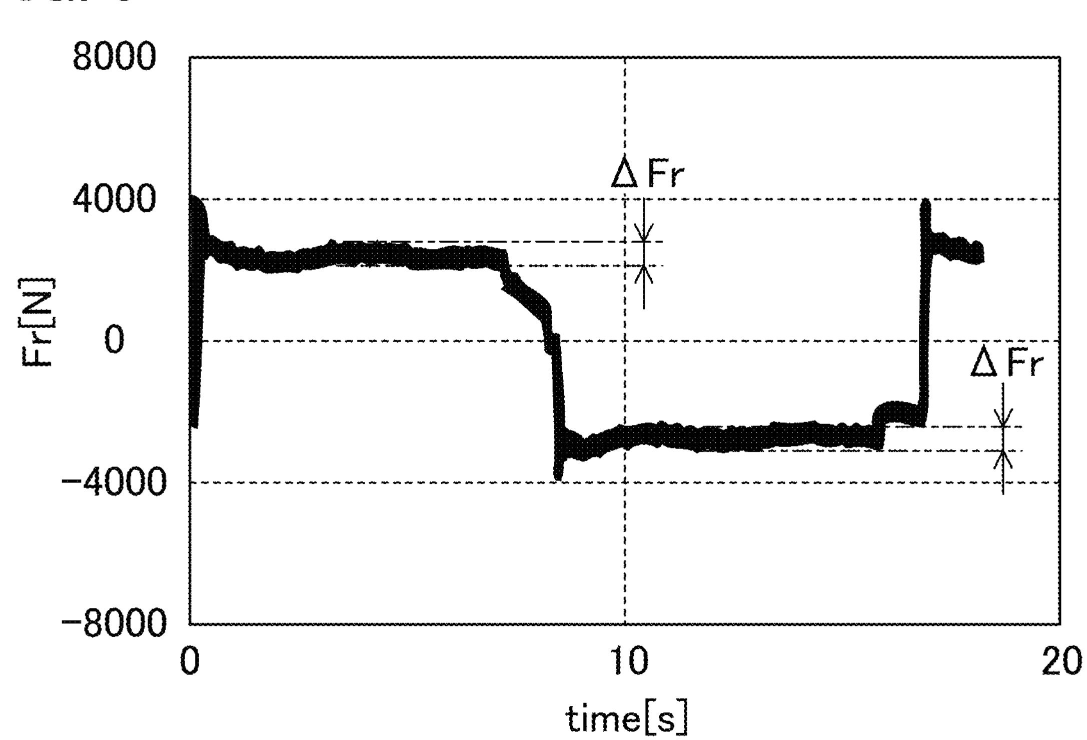
FIG. 9 is a diagram showing a waveform representative of a sliding resistance under low-speed operation of the back-up ring according to Example 1.

FIG. 9 is a diagram showing a waveform of the sliding resistance of the back-up ring according to Example 1 measured during low-speed operation. In FIG. 9 a temporal variation is apparent in the sliding resistance when the shaft 210 moved at a speed of 25 mm/s. As shown in FIG. 9, in Example 1, a variation width of the sliding resistance i.e., the sliding resistance variation ΔFr, was extremely small, and no abnormal noise was generated during measurement.

As will be understood from the foregoing, in each Example, a base material and a filler material were combined to be homogenous with each other, and a result occurrence of abnormal noise was reduced even when the hydraulic cylinder was operating at low speed.

The invention claimed is:

1. A sealing device comprising:

a rod packing configured to seal an annular clearance between a housing and a shaft of a hydraulic cylinder used in construction machinery; and a buffer ring for countering a hydraulic pressure that acts on the rod packing, wherein:

the buffer ring includes an annular packing formed from an elastic material and disposed within the clearance, and a back-up ring in contact with the packing, the back-up ring has a contact surface in contact with the shaft, a body of the back-up ring including the contact surface comprises a resin composition that includes a base material and a filler material, the base material comprises a polyamide resin, the filler material comprises a low friction resin compatible with the polyamide resin such that the filler material is dissolved in the base material to create a homogenous mixture of the base material and the filler material throughout the entire body of the back-up ring, and the filler material has a lower static friction coefficient with respect to the shaft than the polyamide resin.

2. The sealing device according to claim 1, wherein the low friction resin is a polyolefin resin.

3. The sealing device according to claim 2, wherein the polyolefin resin is a maleic acid modified polyolefin resin.

4. The sealing device according to claim 2, wherein the polyolefin resin is a polyethylene resin.

5. The sealing device according to claim 2, wherein a density of the polyolefin resin is equal to or higher than 0.85 and equal to or lower than 0.90.

6. The sealing device according to claim 1, wherein the content of the filler material in the resin composition is equal to or higher than 1 vol % and equal to or lower than 50 vol %.

7. The sealing device according to claim 1, wherein the polyamide resin includes at least one of polyamide 11, polyamide 46, or polyamide 66.

8. The sealing device according to claim 1, wherein the elastic material includes a urethane resin.

9. A back-up ring for countering a hydraulic pressure that acts on a rod packing, and that is configured to seal an annular clearance between a housing and a shaft of a hydraulic cylinder used in construction machinery wherein:

a body of the back-up ring comprises a resin composition that includes a base material and a filler material, the base material comprises a polyamide resin, the filler material comprises a low friction resin compatible with the polyamide resin such that the filler material is dissolved in the base material to create a homogeneous mixture of the base material and the filler material throughout the entire body of the back-up ring, and the filler material has a lower static friction coefficient with respect to the shaft than the polyamide resin.

* * * * *